United States Patent

Singer et al.

[15] 3,654,822

[45] Apr. 11, 1972

[54] MULTIPLE COUNTERSHAFTS TRANSMISSION

[72] Inventors: Robert B. Singer; Earl B. Muir, both of Palos Verdes; Andrew J. Kotzar, Lynwood, all of Calif.

[73] Assignee: White Motor Corporation, Cleveland, Ohio

[22] Filed: May 1, 1970

[21] Appl. No.: 31,851

Related U.S. Application Data

[63] Continuation of Ser. No. 708,254, Feb. 26, 1968.

[52] U.S. Cl. ............................................. 74/681, 74/740
[51] Int. Cl. ................................... F16h 37/08, F16h 3/00
[58] Field of Search ............................................. 74/681, 740

[56] References Cited

UNITED STATES PATENTS

| | | | |
|---|---|---|---|
| 3,572,167 | 3/1971 | Bosko et al. | 74/740 |
| 3,468,192 | 9/1969 | Nasuytis | 74/764 X |
| 2,640,374 | 6/1953 | Willis | 74/745 |
| 3,383,949 | 5/1968 | Edmunds | 74/688 |
| 1,729,220 | 9/1929 | Krell et al. | 74/681 |
| 1,935,018 | 11/1933 | Chambers | 74/740 X |
| 1,981,236 | 11/1934 | Logue | 74/377 X |
| 2,742,986 | 4/1956 | Nallinger | 74/365 X |
| 2,795,963 | 6/1957 | Alfieri | 74/365 X |
| 2,833,160 | 5/1958 | Morgan | 74/681 |
| 2,923,176 | 2/1960 | Randt | 74/740 |
| 2,985,036 | 5/1961 | Forster | 74/740 |
| 3,138,965 | 6/1964 | Brey et al. | 74/331 |
| 3,357,276 | 12/1967 | Vavulo et al. | 74/740 |
| 3,429,202 | 2/1969 | Galicher | 74/740 |

FOREIGN PATENTS OR APPLICATIONS

| | | | |
|---|---|---|---|
| 569,226 | 1/1959 | Belgium | 74/740 |
| 787,524 | 12/1957 | Great Britain | 74/681 |

Primary Examiner—Carlton R. Croyle
Assistant Examiner—Thomas C. Perry
Attorney—Smyth, Roston & Pavitt

[57] ABSTRACT

A gearset including an input shaft, multiple identical countershafts, a quill shaft and appropriate gears and clutches provides choice among multiple paths of power flow to a ring gear and as well as to a sun gear of a set of planetary gearing, the planet gear carrier of the set being connected to an output shaft. In addition, brake means are provided to selectively immobilize the ring gear and the sun gear. The clutches and brakes may be operated in various combinations to provide a progressive series of 32 ratios of speed output to speed input. Gear shift control units may be mounted on the basic transmission assembly interchangeably to provide gear ratios selected from the 32 overall ratios to transform the basic transmission assembly into anyone of five, six, seven, eight, nine, 10, 11, 12, 13 and 15 speed transmissions, there being a family of transmissions available in each category.

32 Claims, 9 Drawing Figures

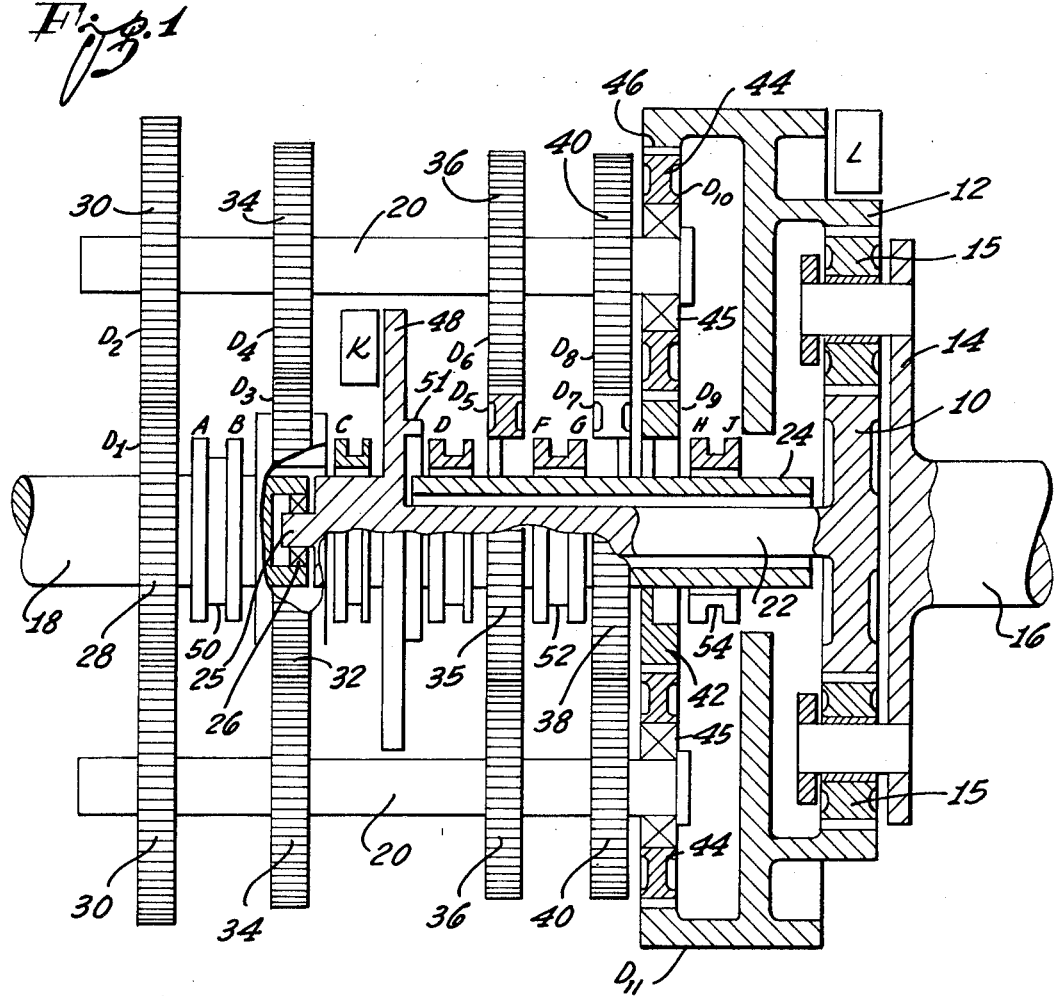

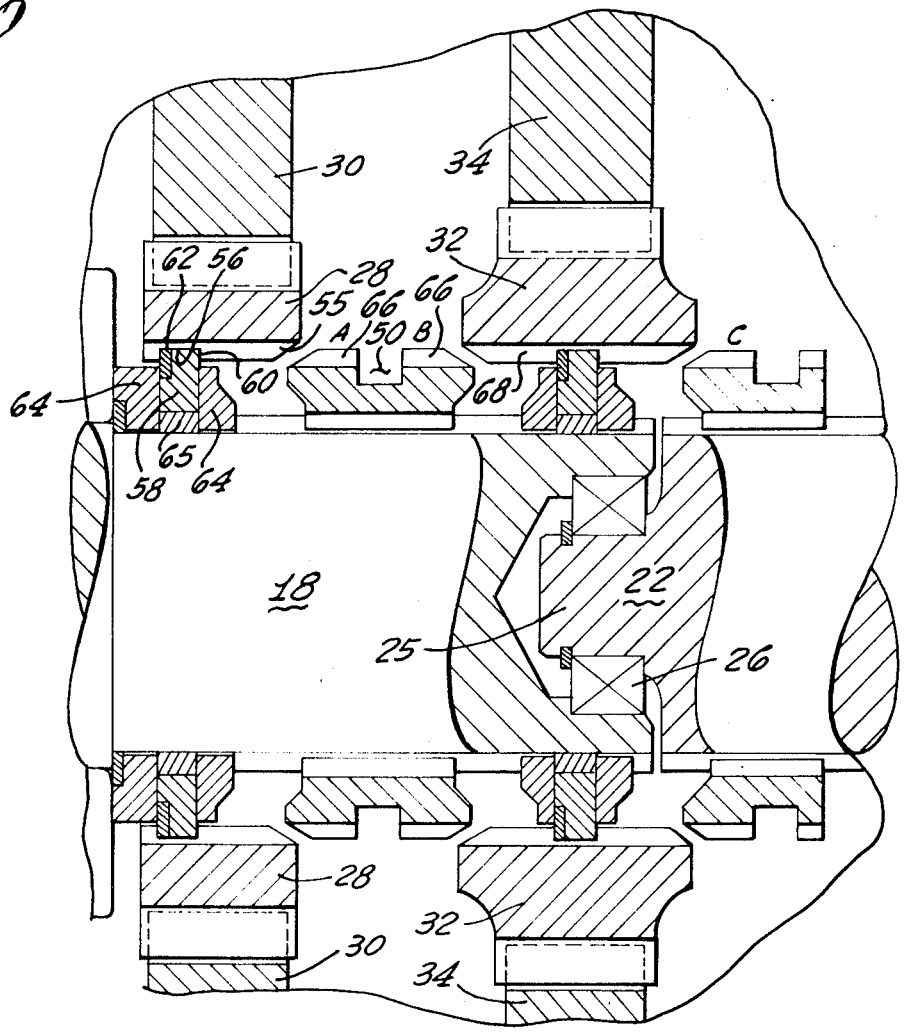

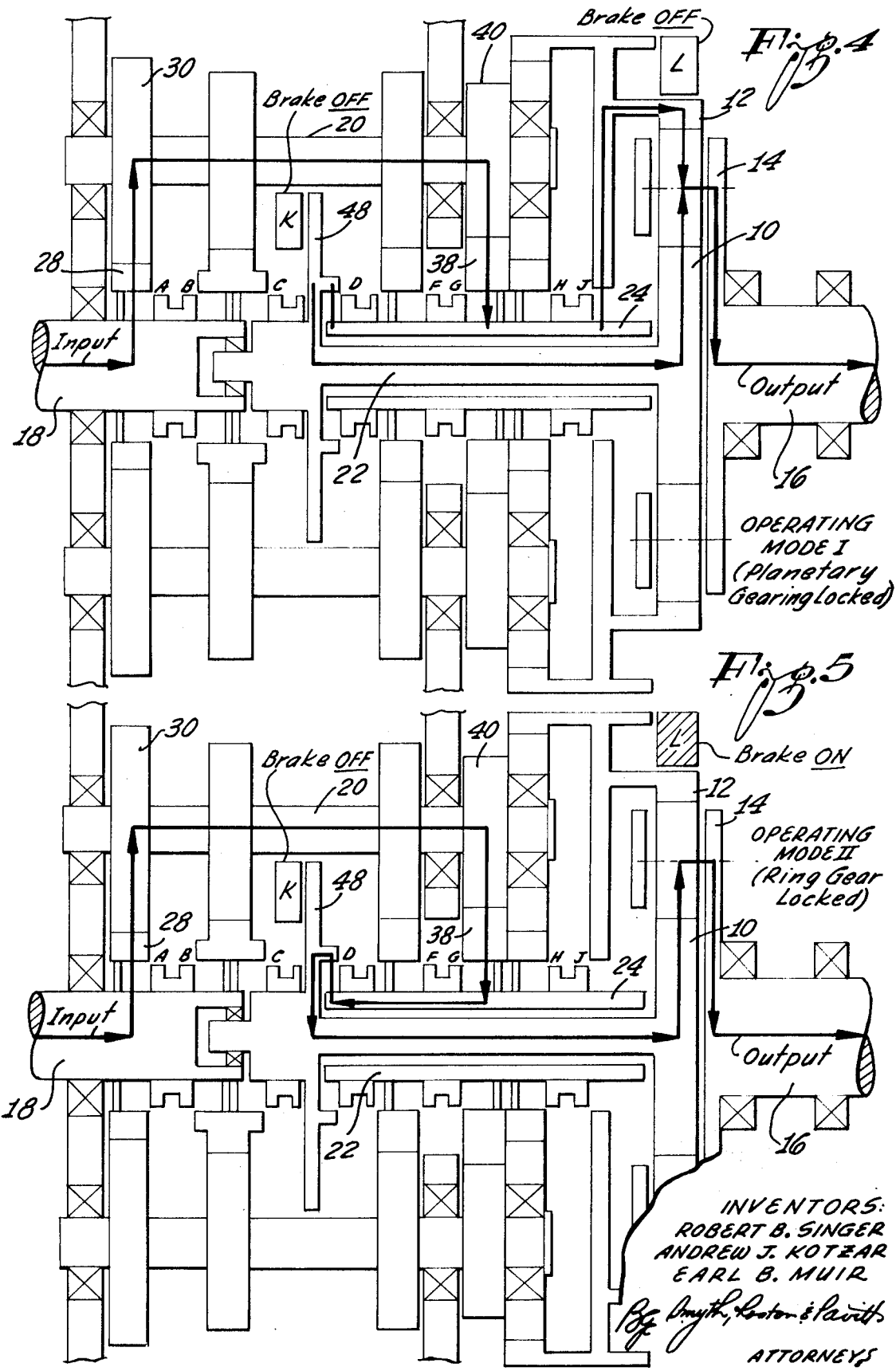

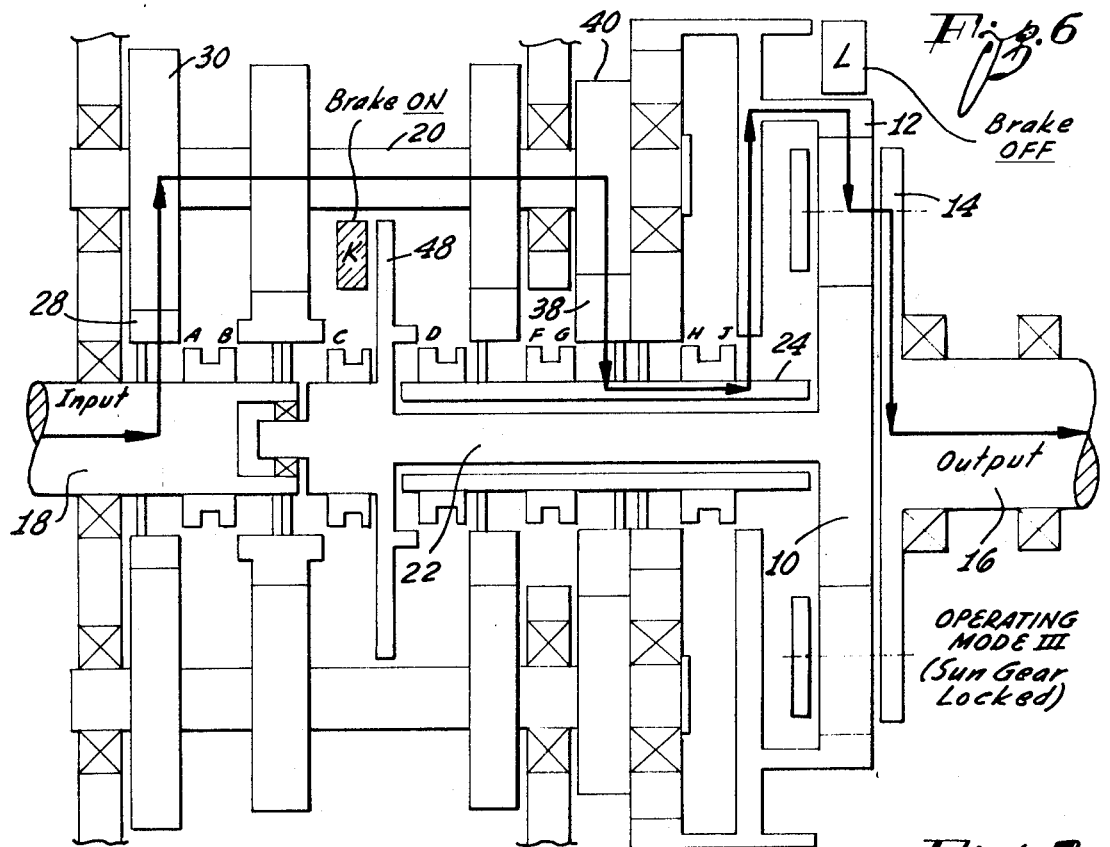
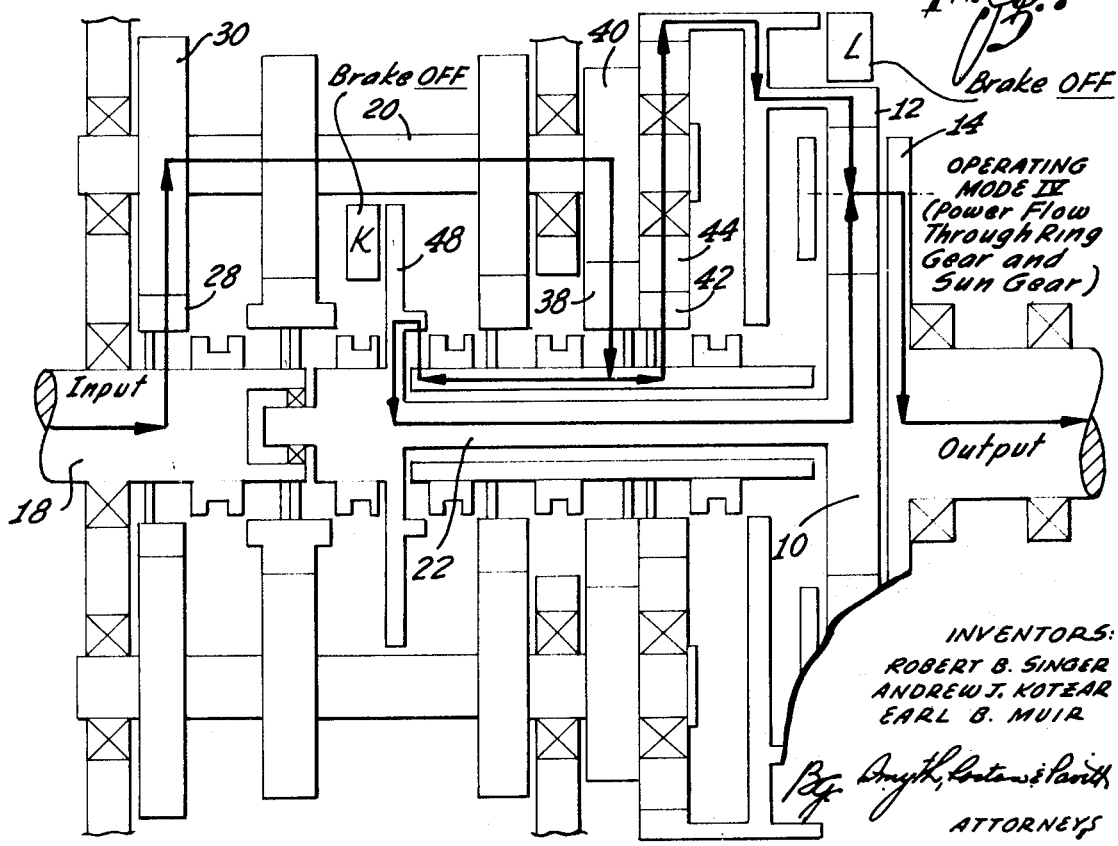

MULTIPLE COUNTERSHAFTS TRANSMISSION

CROSS-REFERENCES TO RELATED APPLICATIONS

This application is a streamlined continuation application of Ser. No. 708,254, filed Feb. 26, 1968 entitled Multiple Countershafts Transmission.

BACKGROUND OF THE INVENTION

A transmission of the type used for trucks and tractors provides a progressive series of ratios of output speed to input speed and, in general, the steps or percentages of ratio increase should progressively widen as the ratios increase. Thus the steps should be relatively large in the low speed ranges where the ratios are large and relatively small in the high speed ranges where the ratios are smaller.

The overall range of speed ratios and the percentage steps within that range that are selected for a given transmission should be based not only on the characteristics of the particular engine that is to be employed but also on the particular trip or route profile data for the contemplated service of the truck or field conditions for a tractor. One set of speed ratios, for example, is desirable for a truck operating in a mountainous region and an entirely different set is desirable for a truck operating in a relatively flat or a metropolitan area.

It would be ideal to customize each individual truck transmission by feeding data including route profile data into a computer to obtain maximum performance from the engine with minimum fuel consumption. Heretofore it has not been practical under mass production conditions to even approach this ideal. Different mass produced transmissions and different versions of the different transmissions have been available but it is seldom that anyone of the transmissions closely matches the particular requirements of a particular purchaser and it is usually too costly to reconstruct a conventional transmission for a closer match.

The present invention is directed to the problem of enabling a manufacturer to approximate closely any particular transmission requirement in a wide range of requirements and to do so in an economical manner in mass production without the necessity of stocking a wide range of models. The specific problem is to provide a transmission assembly that may be readily converted to any desired set of gear ratios and the invention is especially directed to the problem of constructing a basic transmission assembly that is capable of such conversion in a simple and inexpensive manner. The preferred embodiment of the basic transmission assembly may be readily converted to five, six, seven, eight, nine, 10, 11, 12, 13 and 15 speed transmissions with families of transmissions available in each instance.

In addition to the need for this major advance in the art there are certain long standing needs including need for reduction in cost of truck and tractor transmissions, need for reduction in the weight of truck and tractor transmissions, need for reduction in the number and sizes of gears required in a transmission and need for reduction in the loading per inch of gear teeth of truck and tractor transmissions.

The broad object of the present invention is to meet all of these needs for improvement in transmissions and particularly in truck and tractor transmissions.

SUMMARY OF THE INVENTION

The invention provides a transmission assembly incorporating gear trains and clutches that may be employed in various combinations to provide multiple paths of power flow at different overall speed ratios in a graduated series of ratios, the set of speed ratios covering as wide a range as may be desirable for a given installation and with optimum spacing of the speed ratios in that range. The number of available ratios far exceeds the maximum number needed in any given transmission. Thus the preferred embodiment of the invention provides 28 ratios of forward output speed relative to input speed and four ratios of reverse speed.

An important concept taught by the invention is to provide such a transmission assembly in combination with interchangeable shift control units, each control unit being constructed to actuate a selected number of the available ratios of output speed to input speed. In effect, the interchangeable control units are adapters for selective application to a basic transmission assembly with no need whatsoever to disturb the internal structure of the transmission assembly. It is apparent that this concept may be embodied in various arrangements of gearing and clutches within the scope of the invention.

The preferred embodiment of the invention disclosed herein which is designed for engines in the range of 225 – 600 horsepower, comprises a selective gearset in combination with epicyclic gearing in the form of simple planetary gearing, the gearset providing multiple paths of power flow to the sun gear and the ring gear respectively of the planetary gearing with the planet gear carrier connected to the output shaft of the transmission. In addition to clutches incorporated in the gearset for selection of paths of power flow therethrough, brake means are provided to releasably immobilize the sun gear and ring gear selectively. Combinations of four clutches or combinations of three clutches with one of the two brake means are used for thirty of the 32 speed ratios and a combination of two clutches with one of the two brake means is employed for each of the remaining two speed ratios.

A feature of the presently preferred embodiment of the invention is the provision of two cooperating countershaft means in a compact gearset, namely, a first countershaft means comprising from one to three countershafts parallel with the input shaft and a second countershaft means comprising a quill shaft in axial alignment with the input shaft. With a choice of two paths of power flow of different gear ratios from the input shaft to the first countershaft means and the further choice of two paths of power flow of different gear ratios from the first countershaft means to the second countershaft means and with choice in the opposite directions of rotation of the sun gear and the ring gear of the planetary gearing, the arrangement permits selective activation of six different power paths of different gear ratios from the input shaft to the sun gear and selective activation of eight different power paths from the input shaft to the ring gear. With the further provision of brake means for the sun gear and the ring gear, four different modes of operation are available to provide the 32 different speed ratios.

In the first of the four modes of operation, power flows from the gearset through the planetary gearing with the planetary gearing locked to rotate as a unit. In the second mode of operation power flows from the gearset to the sun gear with the ring gear locked. In the third mode of operation power flows from the gearset to the ring gear with the sun gear locked. In the fourth mode of operation power flows from the gearset to the sun gear to drive the sun gear at one speed and power flows simultaneously from the gearset to the ring gear to drive the ring gear at a different speed.

The following familes of versions of the transmission have been made available by selecting appropriate speed ratios from the available 28 forward speed ratios: four versions of a five speed transmission; six versions of a six speed transmission; five versions of a seven speed transmission; four versions of an eight speed transmission; three versions of a nine speed transmission; three versions of a 10 speed transmission; and two versions of a 12 speed transmission. All of these versions may be modified and additional versions may be developed if desired. Since replacing only one of the two gear trains between the input shaft and the first counter shaft means or replacing only one of the two gear trains between the first countershaft means and the second countershaft means changes, many if not most of the 32 gear ratios, it is apparent that the particular series of 32 speed ratios provided by the initial embodiment of the invention is only one series among a large number of series that may be developed.

The basic multiple ratio transmission assembly in combination with the interchangeable control units makes it possible to closely approximate an ideal transmission for any particular power plant for use in any particular kind of service. The basic transmission assemblies may be stocked and shipped without shift controls and at the time of a sale an appropriate shift control unit may be selected in accord with the requirements of a particular purchaser and may be quickly installed without making any internal modifications of the basic transmission assembly. The route profile date for a given truck may be fed into a computer and the optimum shift control unit can be selected along with a fuel system specification for optimum engine torque and fuel curves.

The various features and advantages of the invention may be understood from the following detailed description and the accompanying drawings.

BRIEF DESCRIPTION OF THE DRAWINGS

In the drawings, which are to be regarded as merely illustrative:

FIG. 1 is a view partly in side elevation and partly in section showing the presently preferred embodiment of a transmission incorporating a gearset in combination with simple planetary gearing;

FIG. 2 is an enlarged fragmentary sectional view of a portion of the transmission showing how clutch collars are related to gears on a central shaft of the gearset;

FIG. 3 is a diagram showing the various paths of power flow through the gearset to the planetary gearing;

FIGS. 4, 5, 6 and 7 are power flow diagrams illustrating the four different modes of operation of the transmission;

DESCRIPTION OF THE PREFERRED EMBODIMENT

Figure 8:
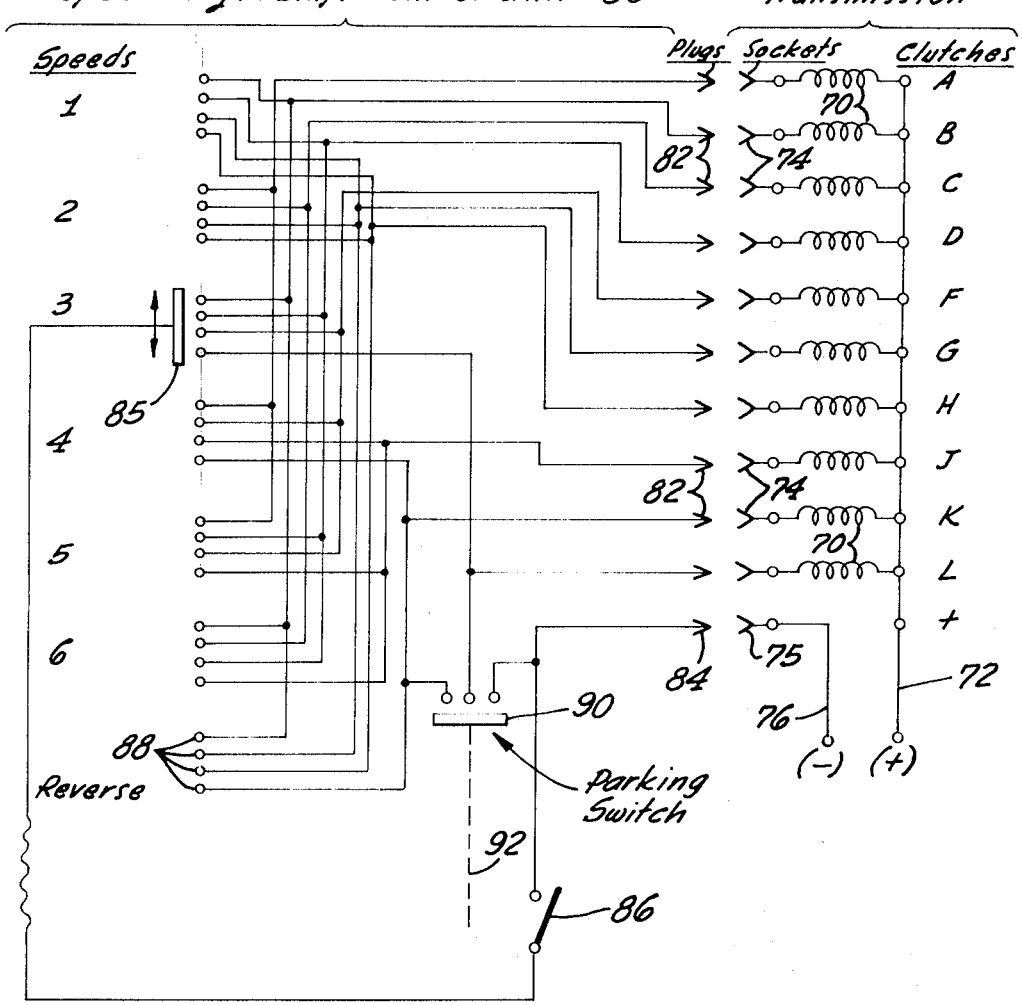
FIG. 8 is a wiring diagram of an electrically actuated six speed plug-in shift control unit for the basic transmission assembly.

In FIG. 1 which illustrates the presently preferred embodiment of the invention, a gearset drives epicyclic gearing in the form of planetary gearing comprising a sun gear 10, a ring gear 12 and a carrier 14 for a plurality of planet gears 15, the carrier being united with an output shaft 16. The gearset includes: an input shaft 18; a first countershaft means comprising at least two countershafts 20 parallel with the input shaft; a sun gear shaft 22 in axial alignment with the input shaft and unitary with the sun gear 10; and a tubular quill shaft 24 that rotatably surrounds the sun gear shaft 22. The various shafts are journaled in suitable bearings and in this particular embodiment a reduced end 25 of the sun gear shaft 22 extends into the adjacent end of the input shaft 18 and is journaled therein by a suitable bearing 26.

A first central gear 28 is floatingly mounted on the input shaft 18 in constant mesh with cooperating gears 30 on the two counter shafts 20; a second central gear 32 is also floatingly mounted on the input shaft in constant mesh with cooperating gears 34 on the counter shafts 20; a third central gear 35 is floatingly mounted on the quill shaft 24 in constant mesh with cooperating gears 36 on the countershafts 20; a fourth central gear 38 is also floatingly mounted on the quill shaft 24 in constant mesh with cooperating gears 40 on the countershafts 20; and, finally, a fifth central gear 42 is also floatingly mounted on the quill shaft 24 in constant mesh with idler gears 44 that are journaled on the countershafts 20 by corresponding gearings 45, the idler gears being in constant mesh with a set of internal teeth 46 on the ring gear 12. Each of the various pairs of gears 28 and 30, 32 and 34, 35 and 36, and 38 and 40 may be termed a gear train functioning between two shafts of the gearset.

The sun gear shaft 22 has an integral disk 48 for cooperation with a brake means represented diagrammatically by a rectangle K to permit the sun gear to be releasably immobilized and a second brake means represented diagrammatically by the rectangle L is provided to releasably immobilize the ring gear 12.

The five central gears 28, 32, 35, 38 and 42 are freely rotatable relative to the shafts on which they are mounted but may be releasably keyed to the shafts by cooperating slidable clutch collars. A first clutch collar designated A is provided to releasably connect the first central gear 28 to the input shaft 18 and a second clutch collar, designated B, is provided to releasably connect the second central gear 32 to the input shaft. These two clutch collars are integral with each other and are formed with a circumferential groove 50 to permit axial shift of the clutch collar by means of a suitable shift fork (not shown).

A third clutch collar, designated C, is adapted for axial shift by a fork and serves to releasably connect the second central gear 32 to the sun gear shaft 22 and a fourth similar gear collar, designated D, cooperates with a toothed flange 51 on the disk 48 to connect the quill shaft 24 directly to the sun gear shaft 22. A fifth clutch collar, designated F, is provided to releasably connect the third central gear 35 to the quill shaft 24 and in like manner a sixth clutch collar G is provided to releasably connect the fourth central gear 38 with a quill shaft, these two clutch collars being integral with each other and being formed with a groove 52 for operation by a suitable shift fork (not shown). A seventh clutch collar, designated H, may be used to connect the fifth central gear 42 to the quill shaft and an eighth clutch collar J is provided to releasably connect the quill shaft to the ring gear 12, these last two clutch collars being integral with each other and forming a groove 54 for operation by a suitable shift fork (not shown).

The manner in which the central gears and the clutch collars are mounted on the shafts may be understood by referring to FIG. 2. The first central gear 28, for example, is in the form of a ring with internal gear teeth 55 and with an inner circumferential surface 56 to seat an inner circumferential retaining ring 58. In the construction shown the retaining ring abuts a shoulder 60 of the central gear and is secured by a suitable snap ring 62. The retaining ring 58 rotates between two retaining collars 64 in sliding contact therewith, the two retaining collars being spaced apart on the input shaft 18 by a spacer ring 65. The two unitary clutch collars A and B are slidingly keyed to the input shaft 18 and are provided with outer circumferential teeth 66 for selective engagement with the internal teeth 55 of the first central gear 28 and with internal teeth 68 of the second central gear 32. The second central gear 32 as well as the other central gears are constructed and confined against axial movement in the same manner as the first central gear.

As heretofore indicated, the described gearset is characterized by the provision of two countershaft means, namely, the countershafts 20 and the quill shaft 24. From another approach the gearset per se, as distinguished from the planetary gearing, is characterized by a compact basic combination of four shafts together with interconnecting gear trains and clutches.

The four shafts are: a first shaft 18 to receive power input to the gearset; a second adjacent shaft 22 in axial alignment with the first shaft for power output from the gearset; a third shaft 20 parallel with the first two shafts; and a fourth tubular shaft 24 for power output from the gearset, the fourth shaft enclosing at least a portion of the second shaft. Since clutches B and C connect the first shaft 18 to the second shaft 22 and clutch D connects the second shaft to the fourth shaft, clutches B,C and D constitute clutch means to connect the first shaft 18 to the fourth shaft 24. It is also apparent that clutches B and C connect the first shaft 18 to the second shaft 22 by connecting the first shaft to the gear train 32, 34 and by connecting the second shaft to the same gear train.

The important relationships that are incorporated in the transmission shown in FIG. 1 may be understood by referring to the diagram in FIG. 3 wherein the power flow through each of the clutches is represented by a corresponding arrow. It is apparent from an inspection of FIG. 3 that the following six paths are available for power flow from the input shaft 18 to the sun gear 10:

AFD
AGD

AC
BFD
BGD
BC

The following eight paths of power flow may be traced from the input shaft to the ring gear 12:

AFH
AFJ
AGH
AGJ
BFH
BFJ
BGH
BGJ

In FIG. 1, $D_1 - D_{11}$ indicate the diameters of the various components that determine the available overall gear ratios, i.e., the ratios of output speed to input speed. Obviously these diameters may vary in different embodiments of the invention. The specific gear ratios that are controlled by the various clutches in this particular embodiment of the invention are shown in Table 1.

TABLE 1

| Clutch | Gears | Ratio |
|---|---|---|
| A | D1/D2 | 1.42 |
| B | D3/D4 | 1.14 |
| C | D4/D3 | 0.875 |
| D | direct | 1.00 |
| F | D6/D5 | 0.975 |
| G | D8/D7 | 1.54 |
| H | D11/D9 | 4.00 |
| J | direct | 1.00 |

$$\text{Planet Ratio (PR)} = \frac{\text{Diameter Ring Gear 12}}{\text{Diameter Sun Gear 10}} = 2.0$$

The four different modes of operation of the transmission and the various combinations of control means, i.e., various combinations of clutches and brake means that are employed for the 28 forward speeds and the four reverse speeds are indicated in Table 2.

TABLE 2

| Operating Mode | Ratio | Clutches and Brakes | The Ratios Involved |
|---|---|---|---|
| I<br>Planetary gearing locked and running as a unit | R1 | BCDJ | 1.0 |
| | R2 | BFDJ | D3/D4 X D6/D5 |
| | R3 | BGDJ | D3/D4 X D8/D7 |
| | R4 | ACDJ | D1/D2 X D4/D3 |
| | R5 | AFDJ | D1/D2 X D6/D5 |
| | R6 | AGDJ | D1/D2 X D8/D7 (FIG. 4) |
| II<br>Driving through sun gear with ring gear locked | R7 | BCL | 1/(1 + PR) |
| | R8 | BFDL | R2 X R7 |
| | R9 | BGDL | R3 X R7 |
| | R10 | ACL | R4 X R7 |
| | R11 | AFDL | R5 X R7 |
| | R12 | AGDL | R6 X R7 (FIG. 5) |
| III<br>Driving through ring gear with sun gear locked | R13 | BFJK | R8 X PR |
| | R14 | BGJK | R9 X PR |
| | R15 | BFHK | R13 X D9/D11 (Reverse) |
| | R16 | BGHK | R14 X D9/D11 (Reverse) |
| | R17 | AFJK | R11 X PR |
| | R18 | AGJK | R12 X PR (FIG. 6) |
| | R19 | AFHK | R17 X D9/D11 (Reverse) |
| | R20 | AGHK | R18 X D9/D11 (Reverse) |
| IV<br>Driving both sun gear and ring gear at different speeds | R21 | BCFJ | R7 + R13 |
| | R22 | BCGJ | R7 + R14 |
| | R23 | BCFH | R7 + R15 |
| | R24 | BCGH | R7 + R16 |
| | R25 | BDFH | R8 + R15 |
| | R26 | BDGH | R9 + R16 |
| | R27 | ACFJ | R10 + R17 |
| | R28 | ACGJ | R10 + R18 |
| | R29 | ACFH | R10 + R19 |
| | R30 | ACGH | R10 + R20 |
| | R31 | ADFH | R11 + R19 |
| | R32 | ADGH | R12 + R20 (FIG. 7) |

In Table 2 the lowest ratio of output speed to input speed is R1 wherein the input shaft 18 is directly connected to the output shaft 16 through the locked planetary gearing. The remaining ratios R2 – R6 in operating mode I are provided solely by the gearset as distinguished from the planetary gearing and in each instance the ratio of output speed to input speed is the product of two gear ratios in the gearset.

By way of example, FIG. 4 shows how ratio R6 in operating mode I is obtained by operating clutches A, D, G and J. It can be seen that the power flow is from the input shaft through clutch A to the countershafts 20 and from the countershafts to the quill shaft 24 through clutch G, the planetary gearing being locked by the quill shaft being directly connected to the ring gear 12 by clutch J and being directly connected to the sun gear by clutch D.

As indicated in Table 2, the first speed ratio R7 in the second mode of operation is determined solely by the planetary ratio, i.e., the ratio between the diameter of the ring gear 12 and the diameter of the sun gear 10. The remaining speed ratios are R8 – R12 in the second mode of operation are products of R7 and ratios R2 – R6.

As an example of the second mode of operation FIG. 5 shows how ratio R12 may be obtained by operating clutches A, G and D in combination with the brake means L. The power flow is from the input shaft 18 to the countershafts 20 through the first central gear 28 and from the countershafts 20 to the quill shaft 24 through the fourth central gear 38. The quill shaft in turn is directly connected to the sun gear 10 and with the ring gear locked by the brake means L, the sun gear drives the planet gear carrier 14.

In the operating mode III shown in Table 2 each ratio is the product of two gear ratios. FIG. 6 shows by way of example how ratio R18 is obtained by operating the clutches A, G, J in combination with the brake means K. Here again the power flow is from the input shaft 18 to the countershafts 20 through the first central gear 28 and from the countershafts 20 to the quill shaft 24 through the fourth central gear 38. With the sun gear 10 locked by the brake means K, the quill shaft 24 is directly connected to the ring gear 12 to cause rotation of the planet gear carrier 14.

In the fourth mode of operation in Table 2 each ratio is the sum of two prior ratios. In FIG. 7 which shows how ratio R32 may be obtained by operating clutches A, D, G and H, the power flow is from the input shaft 18 to the countershafts 20 through the first central gear 28 and from the countershafts 20 to the quill shaft 24 through the fourth central gear 38. The quill shaft 24 is directly connected to the sun gear to drive the sun gear and at the same time is operatively connected to the ring gear 12 through the fifth central gear 42 and the idler gears 44.

Table 3 shows how combinations of the clutches and brake means may be operated to cause the basic transmission assembly to function as a six speed transmission with six forward speeds and a reverse speed.

TABLE 3

| Shift range | Engaged clutches | | | | | | | | | Gear ratio, In/Out | Ground speed at 2,900, engine r.p.m.,[1] m.p.h. |
|---|---|---|---|---|---|---|---|---|---|---|---|
| | A | B | C | D | F | G | H | J | K | L | | |
| 1st | | | X | | X | | X | X | | | 9.69 | 7.25 |
| 2nd | X | | X | | | | X | X | | | 5.50 | 12.76 |
| 3rd | | | X | X | X | | | | | X | 3.37 | 20.80 |
| 4th | X | | | | X | | | X | X | | 2.13 | 32.80 |
| 5th | X | | | X | X | | | | X | | 1.43 | 49.30 |
| 6th | X | X | X | | | | | | X | | 1.00 | 70.00 |
| Reverse | X | | | | X | X | | | X | | −9.69 | −7.25 |

[1] Assuming final drive ratio of 41.5 r.p.m. in=1 m.p.h. out.

In like manner Table 4 indicates the clutches and brake means that may be operated in combination to cause the basic transmission assembly to function as a transmission with a set of thirteen forward speeds and one reverse speed.

TABLE 4

| Shift range | Engaged clutches | | | | | | | | | Gear ratio, In/Out | Ground speed at 2,900, engine r.p.m.,[1] m.p.h. |
|---|---|---|---|---|---|---|---|---|---|---|---|
| | A | B | C | D | F | G | H | J | K | L | | |
| 1st | | X | | | X | | X | X | | | 12.28 | 5.70 |
| 2nd | X | | | X | | X | | X | | | 8.55 | 8.12 |
| 3rd | | | X | | X | X | | X | | | 6.75 | 10.37 |
| 4th | | X | | X | | X | | | | X | 4.85 | 14.43 |
| 5th | X | | X | | | | | | | X | 3.80 | 18.42 |
| 6th | | X | X | | | | | | | X | 3.00 | 23.33 |
| 7th | | X | | | | | | X | X | | 2.42 | 28.93 |
| 8th | X | | | X | | X | | X | | | 2.05 | 34.15 |
| 9th | | X | | | | X | | X | X | | 1.69 | 41.42 |
| 10th | X | | | X | X | | | | X | | 1.43 | 48.95 |
| 11th | X | | X | X | | | | X | | | 1.27 | 55.12 |
| 12th | | X | | X | X | | X | | | | 1.13 | 61.9 |
| 13th | | X | X | X | | | | X | | | 1.00 | 70.00 |
| Reverse | X | | | | X | X | | | X | | −12.28 | −5.70 |

[1] Assuming final drive ratio of 41.5 r.p.m. in=1 m.p.h. out.

It will be apparent to those skilled in the art that interchangeable shift control units for use with the basic transmission assembly may be mechanically actuated, hydraulically actuated, pneumatically actuated or electrically actuated. For the purpose of the present disclosure it is sufficient to describe a wiring diagram shown in FIG. 8 to provide the set of speed ratios listed in Table 3 and to describe the wiring diagram in FIG. 9 for a shift control unit based on Table 4.

As shown in FIG. 8, the basic transmission assembly that is designed for use with various interchangeable control units incorporates ten solenoids represented respectively by coils 70 to operate the respective clutches and brake means. One side of each coil 70 is connected to a lead 72 on one side of the transmission control circuit and the second side of each coil is connected to a corresponding electrical socket element 74. An additional electrical socket element 75 is connected to a lead 76 on the other side of the transmission control circuit.

The plug-in shift control unit 80 has ten electrical pin elements 82 to mate with the corresponding socket elements 74 and has an additional pin element 84 to mate with the socket element 75 to complete the circuit through the control unit. A manually movable wiper contact 85 is connected to the pin element 84 through a switch 86 and is movable to six stations for six forward speeds and a seventh station for reverse speed. At each of the seven stations four stationary contacts 88 for cooperation with the movable wiper contact 85 are connected to pin elements 82 in accord with the tabulation in Table 3. Thus FIG. 8 shows the wiper contact 85 at the third station to energize solenoids for the three clutches B, D and F respectively together with the solenoid for the brake means L.

It is contemplated that the manually movable wiper contact 85 will be latched at whatever station it is placed and that unlatching the wiper contact for shift to a different station will cause the switch 86 to open the transmission circuit, the circuit being restored when the wiper contact is latched at the new station. With all of the solenoids deenergized during each gear shift, the transmission temporarily goes into neutral to afford opportunily for synchronization of the gears involved in the new speed ratio.

Preferably the plug-in control unit 80 includes a normally open parking switch having a movable contact 90 to cooperate with three stationary contacts for completing circuits through the solenoids of the two brake means K and L to immobilize both the sun gear 10 and the ring gear 12. The broken line 92 indicates that the movable contact 90 is operatively connected to a suitable control member (not shown) such as a brake handle.

It is apparent that the shift control unit 80 may be quickly plugged into the basic transmission assembly and may be replaced by a different plug-in control unit whenever desired.

Figure 9:
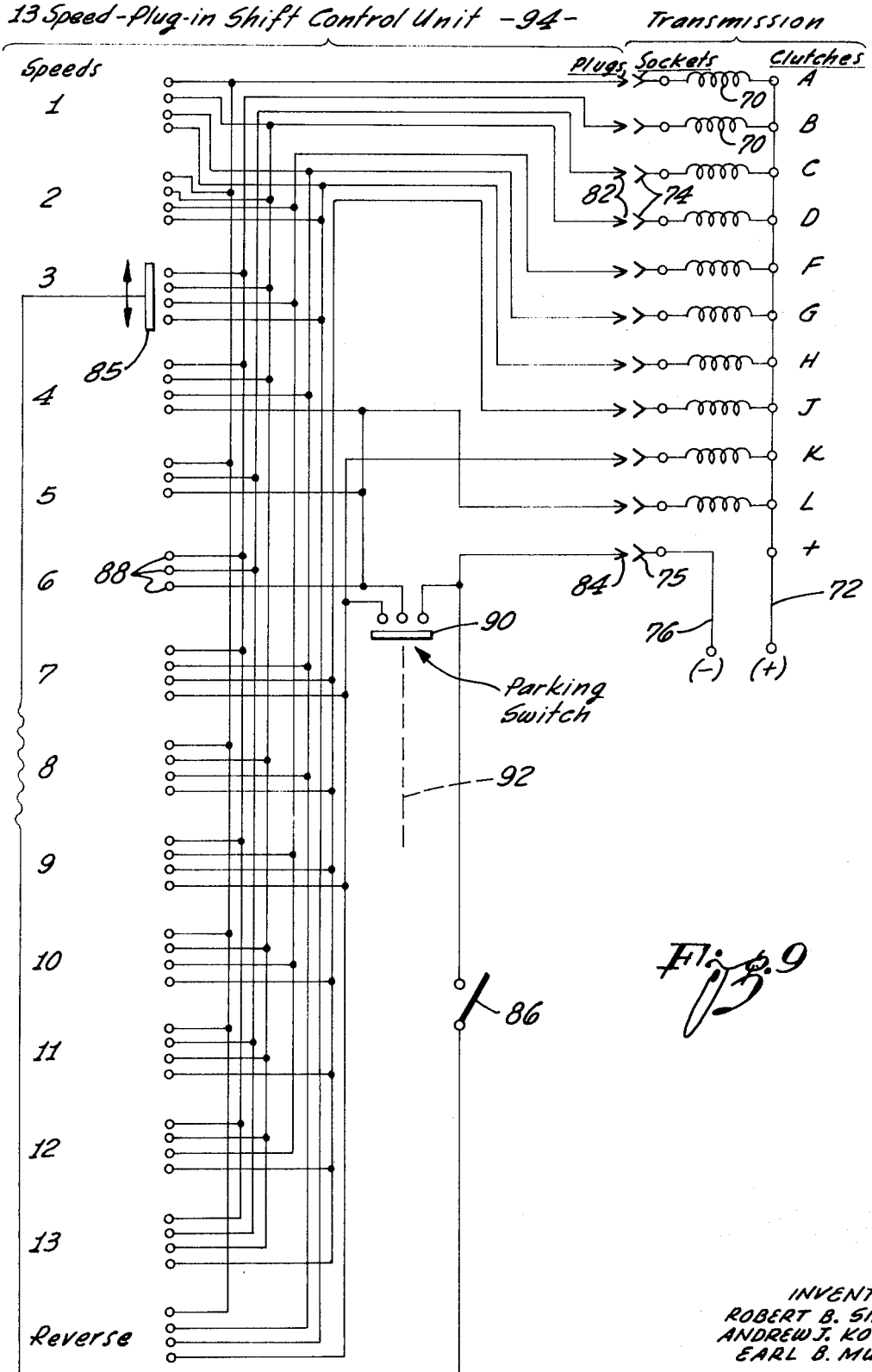
FIG. 9 is a similar wiring diagram of a 13 speed plug-in shift control unit.

In FIG. 9 the basic transmission assembly is, of course, the same as shown in FIG. 8. The plug-in shift control unit 94 has the usual electrical pin elements 82 to mate with the socket elements 74 and the usual additional pin element 84 to mate with the additional socket element 75. The usual manually operable wiper contact 85 is movable to 13 stations for 13 forward speed ratios and a 14 station for a reverse speed ratio. Each of the two stations 5 and 6 is provided with only three of the stationary contacts 88 the remaining stations being provided with four stationary contacts.

The various stationary contacts 88 are connected to the various electrical pin elements 82 in accord with Table 4. The wiring diagram in FIG. 9 includes the usual switch 86 for deenergizing the wiper contact 85 when the wiper contact is shifted from one station to another and preferably the control unit includes a previously described parking switch having a movable contact 90.

One advantage of the disclosed basic transmission assembly is that it may be smaller than a comparable transmission assembly both in length and height. The fact that the transmission weighs substantially less and costs substantially less than comparable transmissions is attributed in large part to the fact that the transmission incorporates substantially fewer parts, there being not only fewer gears but also fewer different sizes of gears. A further cost factor is that the components of the basic transmission assembly may be grouped into relatively light bench type sub-assemblies.

Our description in specific detail of the presently preferred embodiment of the invention will suggest various changes substitutions and other departures from our disclosure within the spirit and scope of the invention.

We claim:
1. In a transmission of the character described, the combination of:
   a rotary input member;
   a rotary output member;
   a transmission assembly operatively connecting the input member to the output member, said transmission assembly incorporating multiple gear trains for use in various combinations to provide a given number of paths of power flow through the transmission assembly of different overall gear ratios in a progressive series of overall gear ratios,
   said given number being substantially in excess of the number of overall gear ratios required for the operation of any one of a plurality of vehicles;
   a plurality of controls including a plurality of clutches incorporated in the transmission assembly for use selectively to activate said given number of paths of power flow, respectively; and
   a plurality of shift control units for operative connection interchangeably to said transmission assembly for actuating said controls,
   each of said interchangeable shift control units being effective to activate a selected number of said paths of power flow less than said given number in a progressive series of overall gear ratios,
   said selected number of paths of power flow operable by each of the interchangeable shift control units being ap- propriate for a particular vehicle in a particular kind of service.

2. A combination as set forth in claim 1 in which said transmission assembly comprises a gearset and planetary gearing having at least three interacting rotary components, the gear set being operatively connected to two of the rotary components, the third rotary component being connected to said rotary output member;

and in which said gear set includes two countershaft means with plural paths of power flow for use selectively from the rotary input member through the two countershaft means to said two of the rotary components.

3. A combination as set forth in claim 2 in which said first countershaft means comprises at least one shaft parallel with the axis of the rotary input member;
in which said second countershaft means is a tubular shaft in axial alignment with the rotary input member,
and in which a shaft extending through the tubular shaft is connected to one of said two rotary components.

4. A combination as set forth in claim 2 in which said plurality of control means includes releasable means to immobilize at least one of said first and second components of the planetary gearing.

5. A combination as set forth in claim 2 in which said plurality of control means includes means to immobilize said first rotary component of the planetary gearing, and means to immobilize the second rotary component.

6. A combination as set forth in claim 1 in which all of said plurality of controls are employed in said selected number of combinations.

7. A combination as set forth in claim 1 in which said given number of paths of power flow is substantially larger than the number of gear trains.

8. In a transmission of the character described, the combination of:
a rotary output member;
a gearset including a rotary input member, first countershaft means and second countershaft means;
planetary gearing having at least three interacting rotary components;
gear trains to interconnect various parts of the gearset and to connect the gearset to the planetary gearing,
said gear trains including a first plurality of gear trains or different gear ratios in the gearset to connect the rotary input member to the first countershaft means,
said gear trains further including a second plurality of gear trains of different gear ratios in the gearset to connect the first countershaft means to the second countershaft means;
controls to activate said gear trains selectively;
a control including a clutch to connect the first countershaft means to one of a first and a second of said rotary components to rotate said one rotary component in one direction;
a control including a clutch to connect the second countershaft means to the same rotary component to rotate the same rotary component in the opposite direction;
a third rotary component of the planetary gearing being connected to said output member;
a control to immobilize at least one of said first and second rotary components of the planetary gearing; and
means to operate a given number of predetermined combinations of said controls selectively to complete the given number of paths of power flow through the gearset to the planetary gearing to drive said third rotary component of the planetary gearing at different speeds relative to the speed of said input member in a progressive series of relative speeds,
said given number of combinations exceeding the total number of gear trains.

9. In a transmission of the character described, the combination of:
a rotary output member;
planetary gearing having at least three interacting rotary components;
a gearset including a rotary input member, first countershaft means in parallel with said rotary input member, second countershaft means in the form of a tubular shaft in axial alignment with the rotary input member and a shaft extending through the tubular shaft to one of a first and a second of said rotary components of the planetary gearing;
gear trains to interconnect various parts of the gearset and to connect the gearset to the planetary gearing,
said gear trains including a first plurality of gear trains of different gear ratios in the gearset to connect the rotary input member to the first countershaft means,
said gear trains further including a second plurality of gear trains of different gear ratios in the gearset to connect the first countershaft means to the second countershaft means;
controls to activate said gear trains selectively;
controls to operatively connect the gearset selectively to a first rotary component and a second rotary component of the planetary gearing;
a third rotary component of the planetary gearing being connected to said output member;
a control to immobilize at least one of said first and second rotary components of the planetary gearing; and
means to operate a given number of predetermined combinations of said controls selectively to complete the given number of paths of power flow through the gearset to the planetary gearing to drive said third rotary component of the planetary gearing at different speeds relative to the speed of said input member in a progressive series of relative speeds,
said given number of combinations exceeding the total number of gear trains.

10. A combination as set forth in claim 9 which includes means to releasably connect the input member to the shaft that extends through the tubular shaft.

11. A combination as set forth in claim 9 in which said first countershaft means comprises a plurality of countershafts in symmetrical arrangement about the axis of the input member.

12. A combination as set forth in claim 11 in which the planetary gearing includes a sun gear, a ring gear and a planet gear carrier, said planet gear carrier being connected to said rotary output member;
and in which said shaft that extends through the tubular shaft is united with said sun gear for rotation thereof.

13. A combination as set forth in claim 12 in which one of said clutch means is effective to operatively connect the tubular shaft to the ring gear.

14. A combination as set forth in claim 11 which further includes:
a central gear floatingly mounted on the tubular shaft;
idler gear means in constant mesh with said last mentioned central gear and with said ring gear;
and in which said clutches include a clutch to operatively connect said last mentioned floating central gear with the tubular shaft.

15. A combination as set forth in claim 14 in which said idler gear means comprises a plurality of gears rotatably mounted on the plurality of shafts of the first counter shaft means.

16. In a transmission of the character described, the combination of:
a rotary output member;

a gearset including a rotary input member, first countershaft means and second countershaft means;

planetary gearing having at least three interacting rotary components;

gear trains to interconnect various parts of the gearset and to connect the gearset to the planetary gearing, said gear trains including a first plurality of gear trains of different gear ratios in the gearset to connect the rotary input member to the first countershaft means, said gear trains further including a second plurality of gear trains of different gear ratios in the gearset to connect the first countershaft means to the second countershaft means;

controls to activate said gear trains selectively;

controls to operatively connect the gearset selectively to a first rotary component and to a second rotary component of the planetary gearing;

a third rotary component of the planetary gearing being connected to said output member;

a control to immobilize at least one of said first and second rotary components of the planetary gearing; and means to operate a given number of predetermined combinations of said controls selectively to complete the given number of paths of power flow through the gearset to the planetary gearing to drive said third rotary component of the planetary gearing at different speeds relative to the speed of said input member in a progressive series of relative speeds, said given number of combinations exceeding the total number of gear trains.

17. A combination as set forth in claim 16 which includes means including a clutch means operative to connect the first countershaft means to one of said first and second components;

and which includes clutch means to lock the planetary gearing for rotation as a unit.

18. A combination as set forth in claim 16 in which at least most of said predetermined combinations of the controls consist of combinations of four controls.

19. A combination as set forth in claim 16 in which said first plurality of gear trains constitute the sole paths of power flow from said input member.

20. A combination as set forth in claim 16 in which the second countershaft means is actuated solely by said second plurality of gear trains.

21. A combination as set forth in claim 16 in which said given number substantially exceeds the number of different speeds required for any one vehicle;

in which said given number includes various sets of fewer than said given number of combinations suitable for particular vehicles;

and in which the combinations in each of said sets includes all of said controls.

22. A combination as set forth in claim 21 which includes a removable shift control unit to operate said controls to provide a selected one of said various sets of combinations appropriate for a given vehicle.

23. A combination as set forth in claim 22 in which said removable shift control unit is one of a plurality of different interchangeable shift control units to permit the transmission to be adapted to the needs of different vehicles.

24. In a transmission of the character described, the combination of:

a rotary input member;

a rotary output member;

planetary gearing including first, second and third interacting rotary components, the third rotary component being connected to the output member;

a gearset actuated by the input member and incorporating multiple gear trains to provide a number of paths of power flow through the gearset of different overall gear ratios;

a plurality of control means including a first brake means to immobilize said first rotary component and a second brake means to immobilize said second rotary component and further including clutches to connect the gearset to said first and second rotary components and to activate various portions of said paths of power flow;

means to operate various combinations of said clutches to lock the planetary gearing for rotation as a unit for a first mode of operation and to activate various of said paths of power flow for different speed ratios in the first mode of operation;

means to operate the first brake means and various combinations of the clutches to activate various of said paths of power flow for a second mode of operation;

means to operate the second brake means and various combinations of the clutches to activate various of said paths of power flow for a third mode of operation; and means to operate various combinations of the clutches to activate various of said paths of power flow to the first rotary component and simultaneously to activate various other of said paths of power flow to the second rotary component for a fourth mode of operation.

25. A method of transmitting power from a rotary input member to a rotary output member at various ratios of output speed to input speed, characterized by the steps of:

connecting one of three interacting components of planetary gearing to said output member with the other two interacting components available for power input;

connecting to said input member a gearset affording choice among multiple gear trains between the input member and a first countershaft means and choice among multiple gear trains between the first countershaft means and a second countershaft means, thereby providing choice of at least two paths of power flow to the first countershaft means and choice among at least six different paths of power flow to the second countershaft means;

carrying out one mode of operation by locking the planetary gear to rotate as a unit and directing one of said paths of power flow from one of the two countershaft means to the planetary gearing for transmission thereby direct to the output member;

carrying out a second mode of operation by immobilizing one of the two available components of the planetary gearing and transmitting one of said paths of power flow from one of the two countershaft means to the other of the two available components of the planetary gearing;

carrying out a third mode of operation by immobilizing the other of the two available components of the planetary gearing and directing one of said paths of power flow from one of the two countershaft means to said one of the two available components of the planetary gearing; and carrying out a fourth mode of operation by directing one of said paths of power flow from the first countershaft means to one of the two available components of the planetary gearing and simultaneously directing one of said paths of power flow from the second countershaft means to the other of the two available components of the planetary gearing.

26. In a transmission, the combination of:

a rotary input member;

a rotary output member;

epicyclic gearing including first, second and third interacting components, the third component being connected to the output member;

a gear set including said input member and having a first countershaft means and a second countershaft means;

means for power flow from one of said countershaft means to said first component of the epicyclic gearing;

means for power flow from one of said countershaft means to the second component of the epicyclic gearing;

means to releasably immobilize the second component of the epicyclic gearing;

multiple gear trains for multiple paths of power flow through the gear set to said first component and for multiple paths of power flow through the gear set to said second component of the epicyclic gearing including a plurality of paths of power flow from the input member through both of the two countershaft means to said first component, said gear trains including a first plurality of gear trains for a plurality of paths of power flow from the input member to the first countershaft means and a second plurality of gear trains for a plurality of paths of power flow from the first countershaft means to the second countershaft means, said gear trains including a reversing gear train for power flow from one of said countershaft means to the second component of the epicyclic gearing; and a plurality of controls to make the various paths of power flow effective selectively, said controls including controls to activate said gear trains selectively.

27. A transmission as set forth in claim 26 in which each of the paths of power flow from the input member to the epicyclic gearing includes one of said countershaft means.

28. A transmission as set forth in claim 26 in which said plurality of controls include means to lock up the epicyclic gearing for rotation as a unit.

29. A transmission as set forth in claim 26 in which said epicyclic gearing is planetary gearing and in which said first, second and third components are respectively a sun gear, a ring gear and a planet gear carrier.

30. A transmission as set forth in claim 26 in which said input member and second countershaft means are in axial alignment with each other.

31. A transmission as set forth in claim 26 in which said plurality of controls are operable to divide the power flow between said first and second components for a progressive series of overall gear ratios for one range of speeds;

in which the plurality of controls are operable to lock up the epicyclic gearing to rotate as a unit for a progressive series of overall gear ratios for another range of speeds; and in which with said immobilizing means effective to immobilize said second component the plurality of controls are operable for power flow to said first components for a progressive series of overall gear ratios for still another range of speeds.

32. A transmission as set forth in claim 26 which includes means to releasably immobilize said first component.

* * * * *